United States Patent
Stephens

(10) Patent No.: US 7,353,534 B2
(45) Date of Patent: Apr. 1, 2008

(54) METHODS, SYSTEMS AND COMPUTER PROGRAM PRODUCTS FOR ESTABLISHING A TRUSTED NETWORK

(75) Inventor: Robert T. Stephens, Sharpsburg, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 764 days.

(21) Appl. No.: 10/828,050

(22) Filed: Apr. 20, 2004

(65) Prior Publication Data

US 2005/0235343 A1 Oct. 20, 2005

(51) Int. Cl.
G06F 17/30 (2006.01)
G06F 15/16 (2006.01)

(52) U.S. Cl. .............................. 726/3; 726/4; 709/217

(58) Field of Classification Search .................... 707/5; 709/217; 726/3, 4
See application file for complete search history.

(56) References Cited

U.S. PATENT DOCUMENTS 6,704,729 B1 3/2004 Klein et al. .................... 707/5

OTHER PUBLICATIONS http://www.google.com/googlefriends/alert2_2000.html, year 2000.*
http://www.yahoo.com, year 2007.*
E-commerce security issues Marchany, R.C.; Tront, J.G.; System Sciences, 2002. HICSS. Proceedings of the 35th Annual Hawaii International Conference on Jan. 7-10, 2002 pp. 2500-2508.*
Fuzzy Trust Interference in Trust Graphs and its Application in Semantic Web Social Networks Lesani, Mohsen; Bagheri, Saeed; World Automation Congress, 2006. WAC '06 Jul. 24-26, 2006 pp. 1-6.*
Peer-to-peer data preservation through storage auctions Cooper, B.F.; Garcia-Molina, H.; Parallel and Distributed Systems, IEEE Transactions on vol. 16, Issue 3, Mar. 2005 pp. 246-257.*

* cited by examiner

Primary Examiner—David Y Jung
(74) Attorney, Agent, or Firm—Cantor Colburn LLP

(57) ABSTRACT

A method for establishing a trusted network. The method includes receiving search parameters from a user and receiving a trusted site associated with the user. A path in the network is traversed in response to metadata associated with the trusted site. The path includes at least one prospective site. The method also includes determining if the prospective site meets the search criteria and assigning a trusted value to the prospective site if the prospective site meets the search criteria. The prospective site is presented to the user if the trusted value is greater than a threshold value.

19 Claims, 4 Drawing Sheets

Your Search: [metadata]  [Search]   Advanced Web Search
Related: metadata definition      Preferences

TRUSTED SITES

1. An Introduction to Metadata
   World Class: Be Part of it, Search: Cybrary for: Home > Papers & Presentations > An Introduction to Metadata, ...1. What is Metadata? ...
   www.library uq.edu.au/iad/ctmeta4.html − 49k − Cached − More pages from this site 2. Nordic Metadata project − homepage
   View Dublin Core Metadata for this page. News ... The follow−up project will enhance the tools developed in Nordic metadata I. NORDIC METADATA II PROJECT GROUP ...
   www.lib heisinki fi/meta/ −22k − Cached − More pages from this site 3. Metadata Tools for Geospatial Data
   Review of CSDGM Metadata Tools including: ASCII templates, BIC Metadata Form, cns, Corpsmet95, Data Dictionary, DataLogr, Dataset Catalog, DBFmeta document ...
   www.state.wi.us/agencies/wdib/sco/metatool/mtools htm − 15k − Cached − More pages from this site

TOP 20 WEB RESULTS out of about 3,650,000

1. Dublin Core Metadata Initiative (DCMI)
   ... 2003−09−15, Makx Dekkers, DCMI Managing Director, has published the next status report of the Dublin Core Metadata Initiative, with highlights of the last year ...
   dublincore org/ −17k − Cached − More pages from this site 2. Metadata at W3C
   Metadata and Resource Description. Metadata is machine understandable information for the web. The W3C Metadata Activity addressed ...
   www.w3.org/Metadata/ −3k − Cached − More pages from this site 3. Digital Libraries: Metadata Resources
   ... URL http://www.w3.org/Metadata/.DUBLIN CORE METADATA INITIATIVE DC−8.
   ...GEOSPATIAL METADATA STANDARDS. American Society for Testing and Materials (ASTM). ...
   www.ifla.org/II/metadata htm −10k − Cached − More pages from this site

*FIG. 5*

METHODS, SYSTEMS AND COMPUTER PROGRAM PRODUCTS FOR ESTABLISHING A TRUSTED NETWORK

FIELD OF THE INVENTION

The present disclosure relates generally to establishing a trusted network and in particular, to methods of establishing a trusted network via metadata.

BACKGROUND OF THE INVENTION

The Internet is a vast store of information, permitting access to tens of millions of websites. Although the ever-increasing number of websites provide access to an immense amount of information, the sheer number of sites available may make it difficult for an Internet user to locate desired information. As a result, Internet search engines have become a necessary and valuable tool for locating information on the Internet.

Not all search engines employ the same search strategy. Some Internet search engines return a "flat" list of results, indexed according to a website's similarity to a user's query. Although these lists are useful, the vast expanse of the Internet has reduced their effectiveness. Other Internet search engines take a different approach and catalog individual websites into hierarchical taxonomies of categories based on the site's content. These category-based search engines not only return the most relevant websites, but also lists of matching categories that describe and encompass relevant websites in order to help users focus their query. In addition, these category-based search engines often display the matching category along with their hierarchically related categories in "category paths" in order to place the matching category in a proper context.

For some time, these categorization techniques were sufficient to provide search engine users with intelligible suggestions. However, just as previous Internet growth necessitated categorization over "flat" result lists, the Internet's recent exponential growth has limited the effectiveness of these taxonomy techniques. In particular, the rapid growth of the Internet has caused a corresponding expansion in the number of categories found in today's search engine taxonomies. As a result, simply categorizing websites and displaying category paths has become unwieldy and unintelligible, often resulting in tens or hundreds of returned category paths. Moreover, the lack of differentiation among the many returned category paths often results in logical redundancies and even irrelevant search results. Therefore, although today's category paths are better than their predecessor "flat" lists of websites, they have been rendered ineffective by the Internet's exponential growth. Further, the issue is not only the fact that there is too much information presented to the user, but also that it is not always possible for a user to determine which information comes from, or has a relationship to, sources that the user deems to be reliable.

SUMMARY OF THE INVENTION

Embodiments of the present invention include a method for establishing a trusted network. The method includes receiving search parameters from a user and receiving a trusted site associated with the user. A path in the network is traversed in response to metadata associated with the trusted site. The path includes at least one prospective site. The method also includes determining if the prospective site meets the search criteria and assigning a trusted value to the prospective site if the prospective site meets the search criteria. The prospective site is presented to the user if the trusted value is greater than a threshold value.

Further embodiments of the present invention include a system for establishing a trusted network. The system includes a network and a host system in communication with the network. The host system includes application software to implement a method including receiving search parameters from a user and receiving a trusted site associated with the user. A path in the network is traversed in response to metadata associated with the trusted site. The path includes at least one prospective site. The method also includes determining if the prospective site meets the search criteria and assigning a trusted value to the prospective site if the prospective site meets the search criteria. The prospective site is presented to the user if the trusted value is greater than a threshold value.

Still further embodiments of the present invention include a computer program product for establishing a trusted network. The computer program product includes a storage medium readable by a processing circuit and stores instructions for execution by the processing circuit for facilitating a method that includes receiving search parameters from a user and receiving a trusted site associated with the user. A path in the network is traversed in response to metadata associated with the trusted site. The path includes at least one prospective site. The method also includes determining if the prospective site meets the search criteria and assigning a trusted value to the prospective site if the prospective site meets the search criteria. The prospective site is presented to the user if the trusted value is greater than a threshold value.

Other systems, methods and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring to the exemplary drawings wherein like elements are numbered alike in the several FIGURES:

FIG. 5 is a sample user interface screen for presenting the results of a trusted network search to a user in accordance with exemplary embodiments of the present invention.

DETAILED DESCRIPTION OF THE INVENTION

Exemplary embodiments of the present invention utilize a user defined trusted network to establish the credibility of information sources received via a network such as the Internet. A user may designate one or more websites as core trusted sites. A trusted network is built around user designated core trusted sites by tracking the relationship of the core sites to other sites in the network. It is assumed that if a user trusts the information in a particular website, then the user also trusts other websites that have some type of relationship with the trusted website. Relationships may include: other websites by the same author; websites that are linked to the trusted site; and websites from the same organization as the trusted website. The user confidence, or trust, in the other websites is not as strong as the trust in the core trusted sites, but there is an element of trust nonetheless. When a user requests that a search be performed for particular search parameters, the trusted websites and links from the trusted websites are searched. In addition, the metadata associated with the trusted websites are also utilized to perform a trusted search. The results of the trusted search are presented back to the user, or requestor. In addition, a search utilizing a typical search engine may also be performed based on the search parameters and also presented back to the user. In this manner, the user may receive a list of trusted sites that meet the search parameters as well as a list of sites located by a typical search engine that meet the search parameters.

Figure 1:
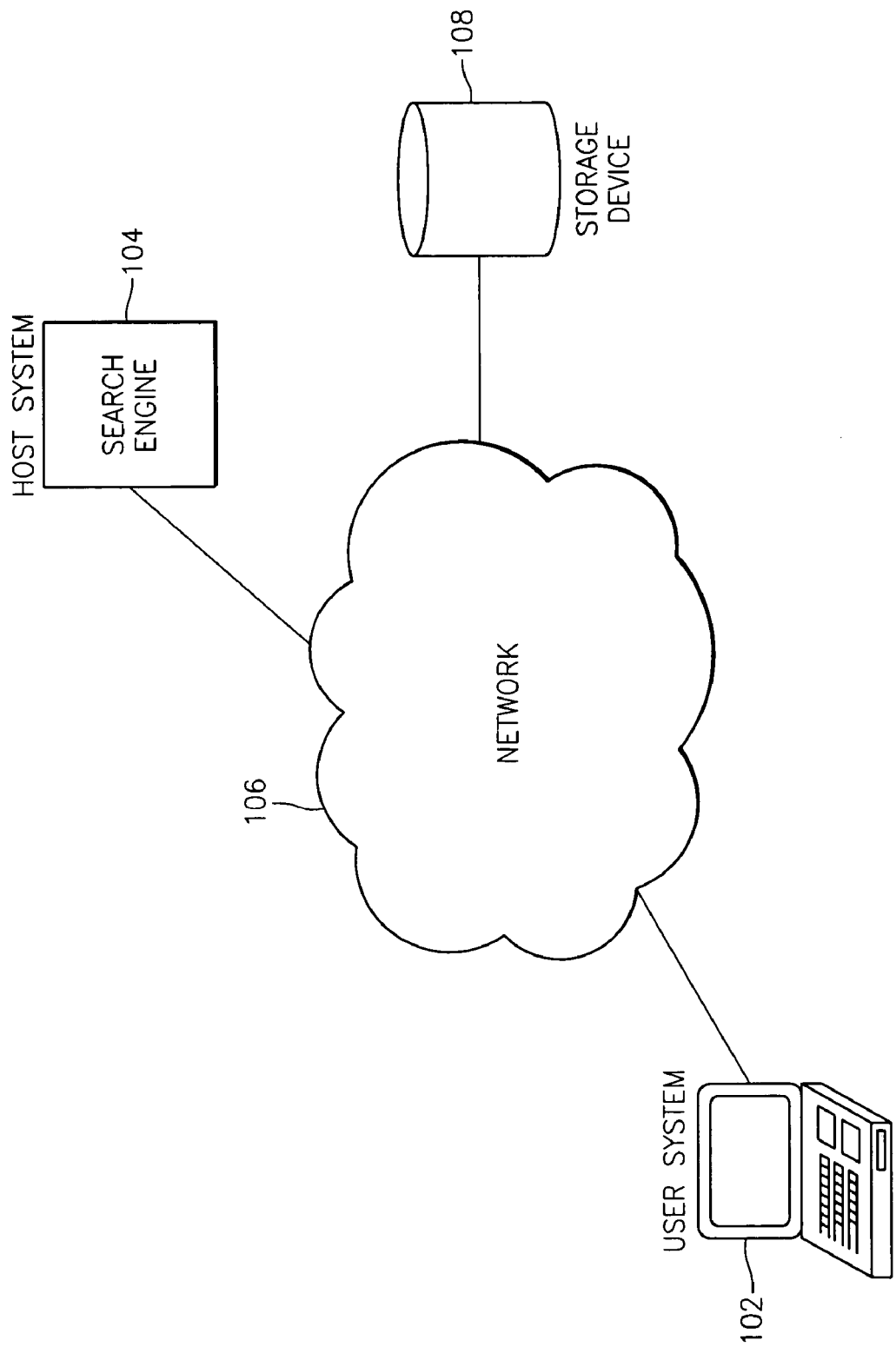
FIG. 1 is a block diagram of an exemplary system for establishing and utilizing a trusted network in accordance with exemplary embodiments of the present invention.

FIG. 1 is a block diagram of an exemplary system for establishing and utilizing a trusted network in accordance with exemplary embodiments of the present invention. The exemplary system includes a host system 104 for executing a search engine. The system in FIG. 1 also includes one or more user systems 102 through which users located at one or more geographic locations may contact the host system 104 to initiate a trusted network search engine or to set up a trusted site list. In exemplary embodiments of the present invention, the host system 104 executes the search engine application and the user system 102 is coupled to the host system 104 via a network 106. In alternate exemplary embodiments, the user system 102 is directly connected to the host system 104. Each user system 102 may be implemented using a general-purpose computer executing a computer program for carrying out the processes described herein. The user system 102 may be a personal computer (e.g., a lap top, a personal digital assistant) or a host attached terminal. If the user system 102 is a personal computer, the processing described herein may be shared by a user system 102 and the host system 104 (e.g., by providing an applet to the user system 102).

The network 106 may be any type of known network including, but not limited to, a wide area network (WAN), a local area network (LAN), a global network (e.g. Internet), a virtual private network (VPN), and an intranet. The network 106 may be implemented using a wireless network or any kind of physical network implementation known in the art. A user system 102 may be coupled to the host system through multiple networks (e.g., intranet and LAN) so that not all user systems 102 are coupled to the host system 104 through the same network. One or more of the user systems 102 and the host system 104 may be connected to the network 106 in a wireless fashion.

The storage device 108 depicted in FIG. 1 may be implemented using a variety of devices for storing electronic information. It is understood that the storage device 108 may be implemented using memory contained in the host system 104 or it may be a separate physical device. The storage device 108 is logically addressable as a consolidated data source across a distributed environment that includes a network 106. The physical data may be located in a variety of geographic locations depending on application and access requirements. Information stored in the storage device 108 may be retrieved and manipulated via the host system 104. The storage device 108 includes data utilized by the search engine such as a trusted site list for each registered user, along with path length weights and connection types. This data may be global to a group of users or tailored to a particular user. In addition, the storage device may include websites and other data returned to the user in response to search parameters. In exemplary embodiments of the present invention, the host system 104 operates as a database server and coordinates access to application data including data stored on storage device 108. Access to data contained in storage device 108 may be restricted based on user characteristics.

The host system 104 depicted in FIG. 1 may be implemented using one or more servers operating in response to a computer program stored in a storage medium accessible by the server. In exemplary embodiments of the present invention, the host system 104 is an Internet service provider (ISP) server with browser software. The host system 104 operates as a network server (e.g., a web server) to communicate with the user system 102. The host system 104 handles sending and receiving information to and from the user system 102 and can perform associated tasks. The host system 104 may reside behind a firewall to prevent unauthorized access to the host system 104 and enforce any limitations on authorized access. A firewall may be implemented using conventional hardware and/or software as is known in the art.

The host system 104 may also operate as an application server. The host system 104 executes one or more computer programs to perform trusted network search engine functions. One or more application programs within the host system 104 share information to support the trusted network search engine functions. The application software includes code to set up a trusted site list, to perform trusted searching and to present the results of the trusted searching to a user at a user system 102. The processing of the application software may be shared by a user system 102 and the host system 104 by providing an application (e.g., a java applet) to the user system 102. As previously described, it is understood that separate servers may be utilized to implement the network server functions and the application server functions. Alternatively, the network server, the firewall, and the application server may be implemented by a single server executing computer programs to perform the requisite functions.

Figure 2:
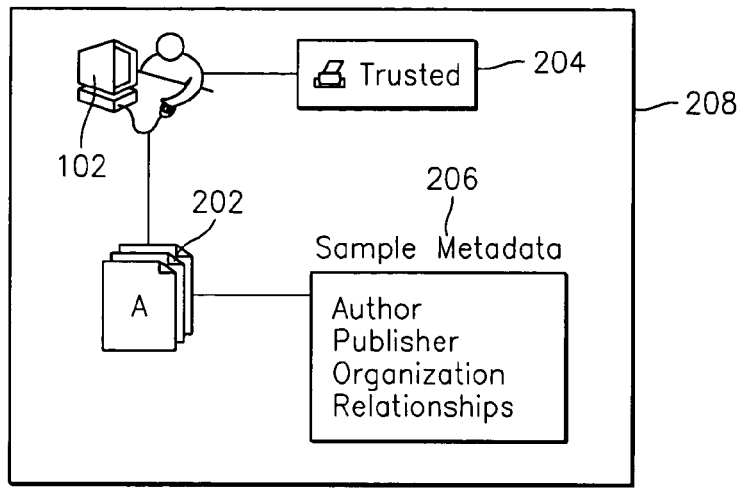
FIG. 2 is a block diagram of an exemplary process for establishing a trusted network in accordance with exemplary embodiments of the present invention.

FIG. 2 is a block diagram of an exemplary process for establishing a trusted network in accordance with exemplary embodiments of the present invention. Metadata is created and stored with web pages and/or websites and used to create trusted networks. As is known in the art, web pages can include metatags, which in turn may include metadata that describes attributes related to the content of the site. Web page metadata may include information such as URL address, dimensions and created date. Additional metadata categories utilized by exemplary embodiments of the present invention include author, publisher, organization and relationships.

FIG. 2 depicts a user at a user system 102, accessing a network, such as the Internet. The trusted button 204 appears on a browser interface screen on the user system 102 as an add-on feature. In the example depicted in FIG. 2, the user locates a page 202 that appears to provide reliable information. In exemplary embodiments of the present invention, the metadata 206 includes URL identifiers for home pages of authors, publishers, organizations and relationships associated with the page 202. The trusted search will include these home pages as well as links and metadata links from the home page as part of the search for user specified search parameters. Exemplary embodiments of the present invention do not require that any metadata tags be associated with a page 202 in order to create a trusted network. Having one or more metadata tags such as author, publisher, organization and relationships allows the trusted search to start at a core site and to branch out from the core site to search more pages. Without this metadata, the trusted search is limited to following the links (e.g., the uniform resource locators (URLs) contained in web pages) from the core site.

The user, via the user system 102, then establishes a trusted relationship with the page 202, or website. In exemplary embodiments of the present invention, the user selects the trusted button 204 to mark the current page 202, or website, as a core trusted site. The address of the core trusted site then gets saved in a trusted site list corresponding to the user. In addition, the user may select whether all of the trust criteria (e.g., author, publisher, organization, relationships) should be utilized when performing searches or whether a user specified subset should be utilized. The default may be set to utilize all of the trust criteria. The list of connection types for metadata trust criteria is intended to be exemplary in nature, and other metadata categories may be utilized without departing from the spirit of exemplary embodiments of the present invention. The trusted site list and associated information may be stored on the storage device 108 and/or the user system 102.

By establishing the core site as a trusted site, an environment is created where the sites connection to this site create a trusted network. If a user trusts a particular core site, then other sites that have a connection to the core site, via metadata and/or links, may have a relationship with the core site may be considered to be part of the trusted network. The user's trust level with this next level of websites is probably not as high as the trust level associated with the core site. This decreased level of trust may be reflected in the order that trusted websites are displayed on a screen on the user system 102.

Figure 3:
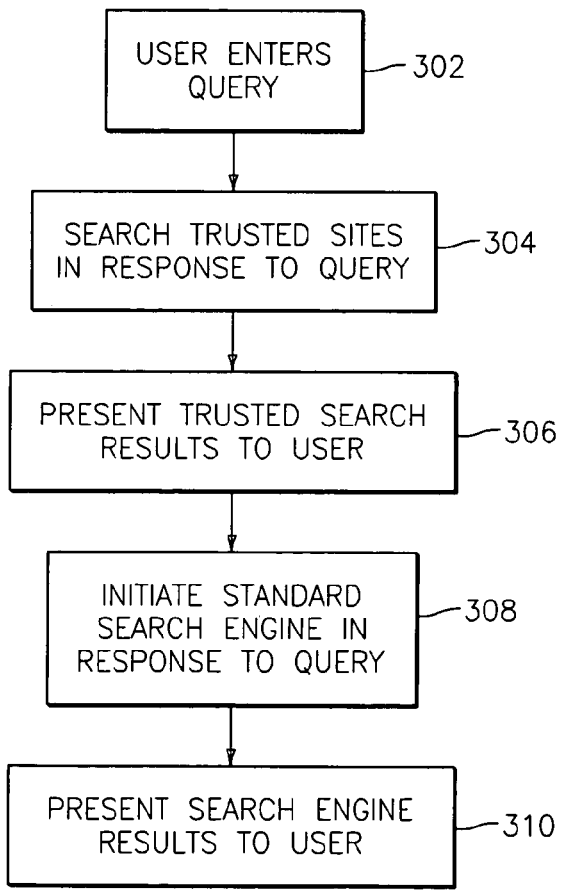
FIG. 3 is a flow diagram of an exemplary process for utilizing a trusted network in accordance with exemplary embodiments of the present invention.

FIG. 3 is a flow diagram of an exemplary process for utilizing a trusted network in accordance with exemplary embodiments of the present invention. At step 302, a user enters a query with search parameters via a user system 102. The search parameters are entered in any manner known in the art such as one of the interfaces utilized by YAHOO or GOOGLE (two of many commercially available search engines). At step 304, the trusted sites are searched in response to the search parameters. When the search is initiated, the trusted search software accesses the core trusted sites from the trusted site list. In exemplary embodiments of the present invention, the search engine performs a spider type search by exhausting all possibilities from metadata and URL links starting at the core trusted sites. The number of levels searched from the core trusted sites may be limited by a threshold value set by the system for all users and/or by a user system for an individual user.

Figure 4:
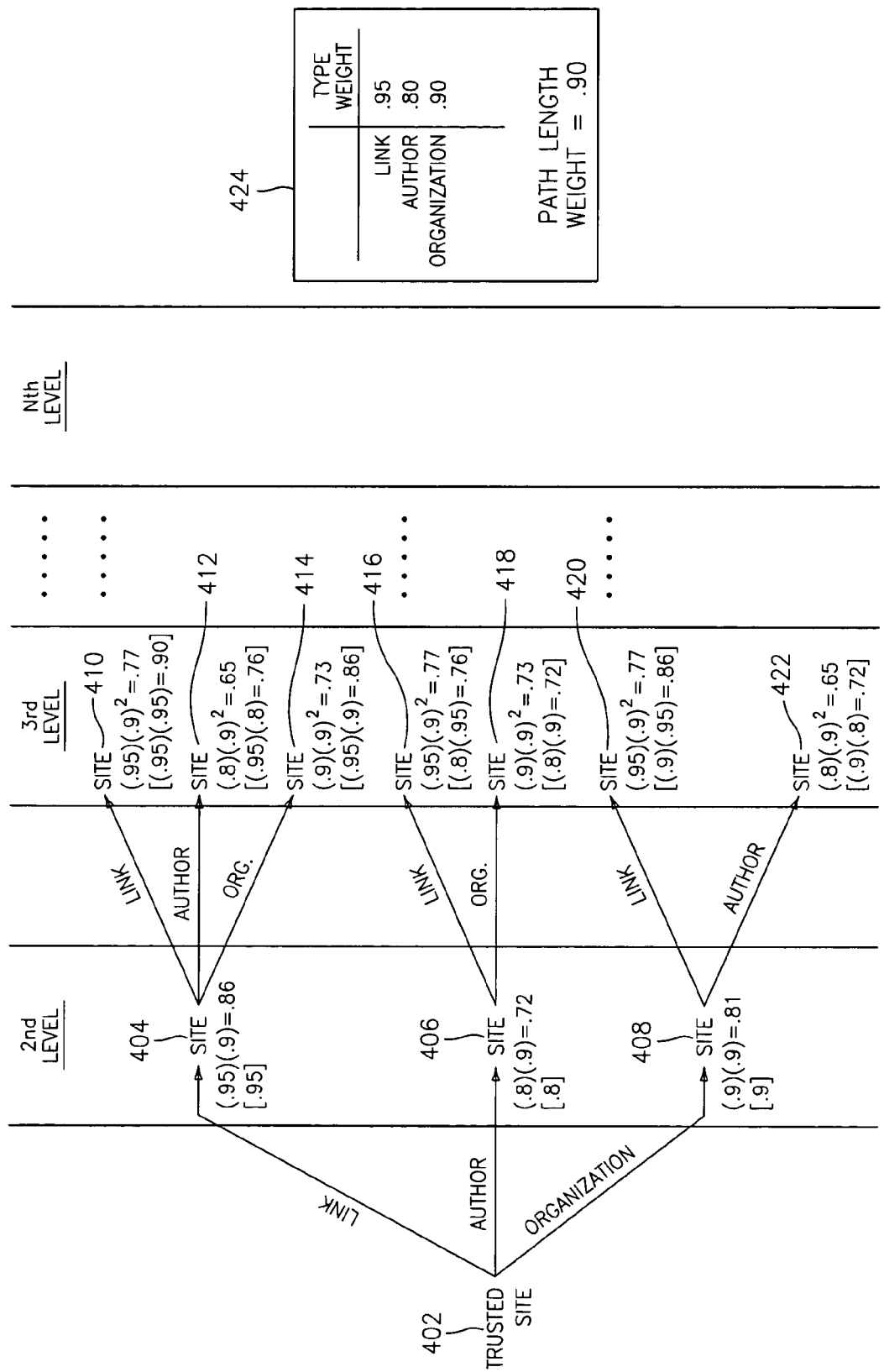
FIG. 4 depicts sample weights and calculations that may be utilized by exemplary embodiments of the present invention to determine the relative trustworthiness of a website.

The searching includes determining the trusted value of websites that match the search criteria. FIG. 4 depicts sample weights and calculations that may be utilized by exemplary embodiments of the present invention to determine the relative trustworthiness, or trusted value, of a website. Type weights such as those shown in box 424 are utilized to assign values to particular types of connections between the located site and the core trusted site. The type weights may be modified by a user via a user system 102, or they may be set on global level for a group of users. In addition, the box 424 includes a path length weight value of nine-tenths (0.90). This weight is used to assign more trustworthiness to sites that are closer in proximity to the core trusted site. The path length weight may be updated by a user via a user system 102, or it may have a set value for an particular implementation.

For example, a website that is accessed via a URL link found in the core trusted site may tend to be more reliable than a website that is accessed via a URL link found in a website that is several links removed from the core trusted site. The values of the type weight and path length weight may be varied to place more importance on distance from the core trusted site than on type of relationship to the core trusted site. In addition, the type weights may be adjusted to place more importance on one type of connection than another. The sample weights depicted in FIG. 4 place more trust value in links than in organizations and more trust value in organizations than authors. Again, all of these values may be altered based on user requirements.

FIG. 4 includes a trusted site 402 and examples of the connections that could be followed from the trusted site 402. In addition, FIG. 4 includes two sample calculations that may be made to determine a trust value to place in the prospective sites located at the second level and third level. As shown in FIG. 4, this process of traversing through possible paths can be performed out to an "nth" level. In exemplary embodiments of the present invention, the number of levels traversed is limited to a selected threshold value (e.g., 3, 10). From the trusted site 402, three paths may be taken to the second level sites. A link may be followed, resulting in site 404. Site 404 includes a calculation that takes the type weight of link (i.e., 0.95) and multiplies it by the path length weight (i.e., 0.90) to come up with a trusted value of eighty-six tenths (0.86). Alternate exemplary embodiments utilize the second calculation shown in brackets at site 404. This calculation uses just the type weight of the link (i.e., 0.95) to determine the trusted value of the site 404.

From site 404, the search could traverse to the next level in one of three manners: via a link to site 410, via author metadata to site 412 and via organization metadata to site 414. Site 410 includes a trusted value calculation that takes the type weight for link (0.95) and multiples it times the path length weight (0.90) once for each link between the site 410 and the trusted site 402. The resulting trusted value at site 410 is seventy-seven tenths (0.77). This calculation puts emphasis on the number of links between the current site 410 and the trusted site 402 as well as the type of relationship of the current site 410 to the previous site 404. Again, alternate exemplary embodiments utilize the second calculation shown in brackets at site 410. This calculation takes the trusted value of the previous site 404 and multiplies it by the type weight of the link (0.95) to come up with a trusted value of nine tenths (0.90). This alternate calculation takes into account the previous types of connections in calculating a trusted value. The other calculations depicted in FIG. 4 are similar and are depicted for each possible outcome for a second and third level. A threshold level may be set to stop searching a path when the trusted value of a site in the path becomes less than the threshold value (e.g., 0.50, 0.33, 0.75). The threshold value may be utilized to control how far to traverse to search for trusted values.

While the search engine is traversing the trusted sites, it may locate websites that match the search criteria. This process of determining if a particular website matches the search parameters may be performed by any commercially available search engine such as GOOGLE and YAHOO. Computer instructions to perform the process described in reference to FIG. 4 may be implemented to guide the commercially available search engines to the trusted locations. The search engines then determine a degree of match between the site and the search parameters. In an alternate exemplary embodiment of the present invention, the trusted search software includes computer instructions to determine a degree of matching between a website and the search parameters. Any software and/or hardware known in the art to determine a degree of match between the contents of a website and search parameters may be utilized by exemplary embodiments of the present invention.

Referring back to FIG. 3, at step 306, the trusted search results are presented to the user via a user interface screen on the user system 102. Next, at step 308, a standard search engine is initiated in response to the search parameters. Again, any commercially available search engine may be utilized. At step 310, the results of the search performed in step 308 are presented to the user via a user interface screen on the user system 102.

FIG. 5 is a sample user interface screen 500 for presenting the results of a trusted network search in accordance with exemplary embodiments of the present invention. At the top section 502 the user enters search parameters and selects the search button to initiate the search. The middle section 504 includes the results of the trusted search. The results may be ordered by best match, by most trusted or by a combination of best match and most trusted. The user may select a preferred order and/or an administrator may set a default order for a group of users. The lower section 506 contains the search results returned by a commercially available search engine. The user interface screen in presented to the user via the user system 102. In alternate exemplary embodiments of the present invention, only the results shown in the middle section 304 are displayed on the user interface screen 500.

Exemplary embodiments of the present invention allow a user to initiate a search within a user defined trusted network of websites. A user may create an individual trusted site list with core sites that the individual deems to be reliable. This allows a web based search to be personalized for each user and not driven by the websites that an ISP has decided to include for all users of the search engine. In addition, exemplary embodiments of the present invention add a layer of semantic understanding by building relationships between websites. The ability to segregate the trusted website search results from the general search results may result in a time savings to the user by directing the individual user's attention to those websites that might be most helpful to the user.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for establishing a trusted network, the method comprising:
receiving search parameters from a user;
receiving a list identifying at least one trusted site associated with the user;
traversing a path in the network in response to metadata associated with the trusted site, the path including at least one prospective, site;
determining if the prospective site meets the search criteria;
assigning a trusted value to the prospective site if the prospective site meets the search criteria; and
presenting the prospective site to the user if the trusted value is greater than a threshold value for establishing the trusted network.

2. The method of claim 1 wherein the traversing is further in response to metadata associated with the prospective site.

3. Use method of claim 1 wherein the traversing is further in response to a link included in the trusted site.

4. The method of claim 3 wherein the traversing is further in response to a link included in the prospective site.

5. The method of claim 1 wherein the metadata includes a network. address for an author.

6. The method of claim 5 wherein the network address is a uniform resource locator address.

7. The method of claim 1 wherein the metadata includes an organization network address.

8. The method of claim 1 wherein the metadata includes a relationship network address.

9. The method of claim 1 wherein the trusted value is responsive to a type weight.

10. The method of claim 9 wherein the threshold value was set by the user.

11. The method of claim 1 wherein the trusted value is responsive to the length of the path between the trusted site and the prospective site.

12. The method of claim 11 wherein the trusted value decreases as the length of the path increases.

13. The method of claim 11 wherein the impact of the path length on the trusted value is set by the user.

14. The method of claim 1 wherein the determining is performed by a commercially available search engine tool.

15. The method of claim 1 wherein the threshold value is sever-tenths.

16. A system for establishing a trusted network, the system comprising:

a host system in communication with the network, said host system including application software to implement a method comprising:

receiving search parameters from a user;

receiving a list identifying at least one trusted site associated with the user;

traversing a path in the network in response to metadata associated with the trusted site, the path including at least one prospective site;

determining if the prospective site meets the search criteria;

assigning a trusted value to the prospective site if the prospective site meets the search criteria; and presenting the prospective site to the user for establishing the trusted network.

17. The system at claim 16 wherein the network is the internet.

18. The system at claim 16 wherein the traversing is further in response to a link included in the trusted site.

19. A computer program product for establishing a trusted network, the computer program product comprising:

a storage medium readable by a processing circuit and storing instructions for execution by the processing circuit for facilitating a method comprising:

receiving search parameters from a user;

receiving a list identifying at least one trusted site associated with the user;

traversing a path in the network in response to one or more of links included in the trusted site and to metadata associated with the trusted site, the path including at least one prospective site;

determining if the prospective site meets the search criteria;

assigning a trusted value to the prospective site if the prospective site meets the search criteria; and presenting the prospective site to the user for establishing the trusted network.

* * * * *